Patented Aug. 21, 1951

2,565,171

UNITED STATES PATENT OFFICE 2,565,171

2,2' - METHYLENEBIS (4 - CHLOROPHENOXY-ACETIC ACID) AND A METHOD FOR ITS PRODUCTION

Herman E. Faith, New Palestine, Ind., assignor to Allied Laboratories, Inc., Kansas City, Mo., a corporation of Delaware No Drawing. Application June 26, 1950,
Serial No. 170,475

5 Claims. (Cl. 260—435)

This invention relates to 2,2'-methylenebis(4-chlorophenoxyacetic acid), salts thereof, and a method for their production.

The compound 2,2'-methylenebis(4-chlorophenol) has been quite extensively used as a fungicidal and bactericidal agent. However, it has only a limited solubility in aqueous media and is not completely satisfactory for those bactericidal and fungicidal applications in which aqueous solutions are preferred. The sodium salt is highly alkaline and its use is likewise not entirely satisfactory for many purposes.

In accordance with the present invention, I have discovered that the dioxyacetic acid derivative of 2,2'-methylenebis(4-chlorophenol) has an increased water-solubility and at the same time retains much of the bactericidal and fungicidal properties of the parent compound. The sodium salt of my new compound is soluble in neutral aqueous solution. It is readily seen, therefore, that my new compounds are useful as bactericidal and fungicidal agents and especially in those applications wherein aqueous solutions are preferred.

The method for preparation is described in detail by the following specific examples—it being understood that the examples are given by way of illustration not limitation.

EXAMPLE 1

*Preparation of 2,2'-methylenebis(4-chlorophenoxyacetic acid)*

Seven grams of 2,2'-methylenebis(4-chlorophenol) are dissolved in a solution of 5.28 g. of sodium hydroxide in 33 ml. of water. Chloroacetic acid (6.3 g.) is added and the solution is refluxed for two hours. The mixture is diluted with water and filtered. The filtrate is acidified with hydrochloric acid and the precipitated product is filtered off when it solidifies. It is dissolved in sodium bicarbonate solution, filtered, and reprecipitated by acidifying. The product is crystallized from dilute ethanol. It melts at 242–245° C. It is soluble in dilute alkali.

The disodium salt is obtained by neutralizing the acid with sodium carbonate or sodium bicarbonate and removing the water by evaporation under pressure which is reduced. It is readily soluble in water giving a neutral solution. The dipotassium salt may be obtained by neutralizing the acid with potassium carbonate, and the alkaline earth metal salts may be obtained by employing an alkaline earth metal carbonate, such as calcium or lithium.

EXAMPLE 2

*Preparation of the hemi-lead salt of 2,2'-methylenebis(4-chlorophenoxyacetic acid)*

2,2'-methylenebis(4-chlorophenoxyacetic acid) (38.7 g.) is dissolved in approximately 900 ml. of acetone. To this solution is added a solution of 4.2 g. of sodium hydroxide in 25 ml. of water. Then 16.5 g. of lead nitrate in 400 ml. of water is added slowly with stirring. The resulting suspension is stirred for two hours and filtered. The lead salt is washed with acetone and then with water.

EXAMPLE 3

*Preparation of the mono-lead salt of 2,2'-methylenebis(4-chlorophenoxyacetic acid)*

2,2'methylenebis(4-chlorophenoxyacetic acid) (38.7 g.) is dissolved in 900 ml. of acetone. To this solution is added 8.4 g. of sodium hydroxide in 50 ml. of water. Then 33.0 g. of lead nitrate in 800 ml. of water is added slowly with stirring. The suspension is stirred one-half hour and filtered. The lead salt is washed with acetone and then with water.

Other heavy metal salts corresponding to the lead salts of Examples 2 and 3 are obtained by using the corresponding nitrate of copper, zinc, mercury, cadmium, aluminum or the like instead of the lead nitrate.

I claim:

1. The compound included in the group consisting of 2,2'-methylenebis(4-chlorophenoxyacetic acid) and salts thereof.

2. The compound 2,2'-methylenebis(4-chlorophenoxyacetic acid).

3. The disodium salt of 2,2'-methylenebis(4-chlorophenoxyacetic acid).

4. The hemi-lead salt of 2,2'-methylenebis(4-chlorophenoxyacetic acid).

5. The process for the preparation of 2,2'-methylenebis(4-chlorophenoxyacetic acid) which comprises reacting the disodium salt of 2,2'-methylenebis(4-chlorophenol) with chloro-acetic acid.

HERMAN E. FAITH.

No references cited